Patented Aug. 21, 1934

1,970,808

UNITED STATES PATENT OFFICE 1,970,808

CONCENTRATION OF ORES BY FLOTATION

William T. MacDonald, Copper Cliff, Ontario, Canada, assignor to The International Nickel Company of Canada, Limited, Copper Cliff, Ontario, Canada, a corporation of Canada No Drawing. Application September 23, 1931, Serial No. 564,714

12 Claims. (Cl. 209—167)

This invention relates to the concentration of ores by flotation, and more particularly to the differential flotation of mixed sulphide ores.

The object of the invention is to provide an improved method of concentration by differential flotation of a complex ore containing sulphide minerals of copper, nickel and iron.

Heretofore, it has been impossible to make an economic separation by flotation or gravity concentration of the copper and nickel minerals in ores of this type. The present invention contemplates an improved method of treating such ores by flotation whereby the copper mineral is first recovered from the ore in the form of a concentrate substantially free from nickel and then the residue from the copper concentration is treated by flotation to recover the nickel mineral in the form of a concentrate substantially free from copper.

I have discovered that the addition of a cyanide in regulated amount to the ore pulp in a flotation operation preferentially inhibits the flotation of the nickel mineral while permitting the flotation of the copper mineral. The cyanide has no appreciable inhibitory effect on the flotation of the iron mineral, pyrrhotite. The presence of a small amount of zinc sulphate or equivalent metal salt in the ore pulp improves the recovery of copper but has no effect on the recovery of nickel in the copper concentrate.

I have also discovered that the addition of small amounts of copper sulphate to the pulp remaining after the removal of the copper concentrate has the effect of enabling the nickel mineral present to be floated in the form of a concentrate containing a large proportion of the nickel present in the original ore.

A general procedure in carrying out the process of the invention is as follows: The ore containing sulphide minerals of copper, nickel and iron, is ground wet to a sufficient degree of fineness to free the minerals. Sufficient lime is added to the ore, preferably during the grinding stage, to make the pulp alkaline. A collecting agent, such an xanthate, is also added to the ore pulp, preferably during the grinding stage. An alkaline cyanide, zinc sulphate, and a frothing agent, such as pine oil, are now mixed with the ore pulp. The ore pulp is then subjected to a flotation operation and a froth concentrate is obtained and separated, containing a large proportion of the copper present in the original ore. Substantially all of the nickel mineral of the original ore is inhibited from floating and remains in the reject of the above flotation operation.

Such reject, constituting the remaining ore pulp, is now mixed with small quantities of copper sulphate, xanthate and pine oil. This reject, with the agents added thereto, as above mentioned, is subjected to a second flotation operation and a froth concentrate is obtained and separated containing a large proportion of the nickel mineral present in the original ore.

I have found that in the treatment as above of an ore containing the nickel mineral, pentlandite, the copper mineral, chalcopyrite, and the iron mineral, pyrrhotite, that the cyanide, when used in properly regulated amount, inhibits the flotation of the pentlandite only and is without inhibitory effect on the pyrrhotite or the chalcopyrite.

For example, in a test on such an ore, the agents added to the ore pulp were lime, pentasol xanthate, pine oil, zinc sulphate and sodium cyanide. The froth concentrate produced had a content of 17.44% copper, 2.75% nickel and 36.69% pyrrhotite, and presented a recovery of 84.93% of the copper, 21.64% of the nickel and 26.56% of the pyrrhotite in the original ore.

In another test on the same ore, using the same agents except that sodium cyanide was not used, the froth concentrate produced had a content of 19.18% copper, 5.30% nickel and 22.62% pyrrhotite, and represented a recovery of 86.62% of the copper, 38.41% of the nickel and 15.38% of the pyrrhotite in the original ore.

In such a case, therefore, it would appear that where cyanide and lime were added, more iron and less nickel were floated; whereas where cyanide is absent, every other factor being held constant, less iron and more nickel were floated. Hence, I conclude that the addition of cyanide in such an operation does not result in the additional inhibition of the flotation of the iron mineral. Moreover, it appears from the tests referred to above that the presence of lime without the presence of cyanide, in the second of the tests just referred to, produces a greater inhibitory effect on the pyrrhotite than in the first of such tests where both lime and cyanide were present. From this I conclude that lime preferentially affects the pyrrhotite and that cyanide preferentially attacks the pentlandite under the conditions of such an operation where both lime and cyanide are present.

The practice of the invention will be further illustrated by the following example:

An ore containing the nickel mineral, pentlandite, the copper mineral, chalcopyrite, and the iron mineral, pyrrhotite, was ground at a pulp density of 70% solids in a laboratory rod mill to pass a 65 mesh sieve. 1.1 pounds of lime and 0.30 pounds of pentasol xanthate per ton of ore were added to the wet ore before it was introduced into the rod mill. The ground pulp was subjected to a flotation operation with 0.05 pounds zinc sulphate and 0.08 pounds sodium cyanide per ton of ore and sufficient pine oil to produce a satisfactory frothing condition. The froth concentrate obtained, which contained most of the copper in the original ore, was cleaned in a second flotation operation with the addition of 2.7 pounds of lime per ton of the original ore. This cleaning operation produced a finished copper concentrate, and a reject that was combined with the nickel concentrate as described below.

The reject from the first flotation operation containing most of the nickel in the original ore was subjected to a third flotation operation with 0.5 pounds of copper sulphate and 0.2 pounds of sodium ethyl xanthate per ton of original ore. The froth concentrate from this operation was combined with the reject from the copper cleaning operation and formed the final nickel concentrate.

The results were as follows:

|  | Heads | Copper concentrate | Nickel concentrate | Final tailing |
|---|---|---|---|---|
| Total percent weight | 100.0 | 14.3 | 38.5 | 47.2 |
| *Assay* |  |  |  |  |
| Percent copper | 3.82 | 21.83 | 1.60 | 0.20 |
| Percent nickel | 2.65 | 2.05 | 5.60 | 0.42 |
| Percent pyrrhotite | 28.36 | 26.23 | 61.69 | 1.80 |
| *Recovery* |  |  |  |  |
| Percent copper | 100.0 | 81.39 | 16.14 | 2.47 |
| Percent nickel | 100.0 | 11.02 | 81.49 | 7.49 |
| Percent pyrrhotite | 100.0 | 13.17 | 83.84 | 2.99 |

In the application of this invention to other ores containing nickel and copper and under varying conditions, the example of the process above described may be modified without departing from this invention, the conditions best adapted for any particular ore being determinable by tests as well known in this art.

I claim:

1. A process of concentrating by froth flotation an ore containing sulphide minerals of copper, nickel and iron to form a copper concentrate which comprises treating the ore in the form of a pulp with a cyanide, and subjecting the thus treated ore to a froth flotation operation whereby the copper mineral is in large part recovered in the resulting froth and the flotation of nickel mineral is in large part inhibited.

2. A process of concentrating by froth flotation an ore containing sulphide minerals of copper and nickel which comprises treating the ore in the form of a pulp with a cyanide and zinc sulphate, and subjecting the thus treated ore to a froth flotation operation whereby the copper mineral is in large part recovered in the resulting froth and the flotation of nickel mineral is in large part inhibited.

3. A process of concentrating by froth flotation an ore containing sulphide minerals of copper, nickel and iron to form a copper concentrate which comprises treating the ore in the form of an alkaline pulp with a cyanide, and subjecting the thus treated ore to a froth flotation operation whereby the copper mineral is in large part recovered in the resulting froth and the flotation of nickel mineral is in large part inhibited.

4. A process of concentrating by froth flotation an ore containing sulphide minerals of copper and nickel which comprises treating the ore in the form of an alkaline pulp with a cyanide and zinc sulphate, and subjecting the thus treated ore to a froth flotation operation whereby the copper mineral is in large part recovered in the resulting froth and the flotation of nickel mineral is in large part inhibited.

5. A process of concentrating by froth flotation an ore containing sulphide minerals of copper and nickel which comprises treating the ore in the form of a pulp with a cyanide, and subjecting the so-treated ore pulp to a froth flotation operation and thereby effecting in large part the flotation of the copper mineral and inhibiting in large part the flotation of the nickel mineral, treating the remaining ore pulp with copper sulphate, and subjecting the so-treated remaining ore pulp to another froth flotation operation whereby the nickel mineral is in large part recovered in the resulting froth.

6. A process of concentrating by froth flotation an ore containing sulphide minerals of copper and nickel which comprises treating the ore in the form of a pulp with a cyanide and zinc sulphate, and subjecting the so-treated ore pulp to a froth flotation operation and thereby effecting in large part the flotation of the copper mineral and inhibiting in large part the flotation of the nickel mineral, treating the remaining ore pulp with copper sulphate, and subjecting the so-treated remaining ore pulp to another froth flotation operation whereby the nickel mineral is in large part recovered in the resulting froth.

7. A process of concentrating by froth flotation an ore containing sulphide minerals of copper and nickel which comprises treating the ore in the form of an alkaline pulp with a cyanide, and subjecting the so-treated ore pulp to a froth flotation operation and thereby effecting in large part the flotation of the copper mineral and inhibiting in large part the flotation of the nickel mineral, treating the remaining ore pulp with copper sulphate, and subjecting the so-treated remaining ore pulp to another froth flotation operation whereby the nickel mineral is in large part recovered in the resulting froth.

8. A process of concentrating by froth flotation an ore containing sulphide minerals of copper and nickel which comprises treating the ore in the form of an alkaline pulp with a cyanide and zinc sulphate, and subjecting the so-treated ore pulp to a froth flotation operation and thereby effecting in large part the flotation of the copper mineral and inhibiting in large part the flotation of the nickel mineral, treating the remaining ore pulp with copper sulphate, and subjecting the so-treated remaining ore pulp to another froth flotation operation whereby the nickel mineral is in large part recovered in the resulting froth.

9. A process of concentrating an ore containing the nickel mineral, pentlandite, the copper mineral, chalcopyrite, and the iron mineral, pyrrhotite, which comprises treating the ore in the form of a pulp with a cyanide, and subjecting the so-treated ore pulp to a froth flotation operation and thereby effecting in large part the flotation of the copper mineral and inhibiting in large part the flotation of the nickel mineral, treating the remaining ore pulp with copper sulphate, and subjecting the so-treated remaining ore pulp to another froth flotation operation whereby the nickel mineral is in large part recovered in the resulting froth.

10. A process of concentrating an ore containing the nickel mineral, pentlandite, the copper mineral, chalcopyrite, and the iron mineral, pyrrhotite, which comprises treating the ore in the form of a pulp with a cyanide and zinc sulphate, and subjecting the so-treated ore pulp to a froth flotation operation and thereby effecting in large part the flotation of the copper mineral and inhibiting in large part the flotation of the nickel mineral, treating the remaining ore pulp with copper sulphate, and subjecting the so-treated remaining ore pulp to another froth flotation operation whereby the nickel mineral is in large part recovered in the resulting froth.

11. A process of concentrating an ore containing the nickel mineral, pentlandite, the copper mineral, chalcopyrite, and the iron mineral, pyrrhotite, which comprises treating the ore in the form of an alkaline pulp with a cyanide, and subjecting the so-treated ore pulp to a froth flotation operation and thereby effecting in large part the flotation of the copper mineral and inhibiting in large part the flotation of the nickel mineral, treating the remaining ore pulp with copper sulphate, and subjecting the so-treated remaining ore pulp to another froth flotation operation whereby the nickel mineral is in large part recovered in the resulting froth.

12. A process of concentrating an ore containing the nickel mineral, pentlandite, the copper mineral, chalcopyrite, and the iron mineral, pyrrhotite, which comprises treating the ore in the form of an alkaline pulp with a cyanide and zinc sulphate, and subjecting the so-treated ore pulp to a froth flotation operation and thereby effecting in large part the flotation of the copper mineral and inhibiting in large part the flotation of the nickel mineral, treating the remaining ore pulp with copper sulphate, and subjecting the so-treated remaining ore pulp to another froth flotation operation whereby the nickel mineral is in large part recovered in the resulting froth.

WILLIAM T. MacDONALD.